(12) United States Patent
Mukherjee

(10) Patent No.: US 9,660,843 B2
(45) Date of Patent: May 23, 2017

(54) APPARATUS FOR PROCESSING A SERIAL DATA STREAM

(71) Applicant: TEXAS INSTRUMENTS INCORPORATED, Dallas, TX (US)

(72) Inventor: Tonmoy Shankar Mukherjee, Thousand Oaks, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/876,206

(22) Filed: Oct. 6, 2015

(65) Prior Publication Data

US 2016/0359645 A1    Dec. 8, 2016

Related U.S. Application Data

(60) Provisional application No. 62/171,409, filed on Jun. 5, 2015.

(51) Int. Cl.
*H03H 7/30* (2006.01)
*H04L 25/03* (2006.01)
*H04L 7/00* (2006.01)

(52) U.S. Cl.
CPC ...... *H04L 25/03057* (2013.01); *H04L 7/0045* (2013.01)

(58) Field of Classification Search
CPC ................................................ H04L 25/03057
USPC ........................................................ 375/233
See application file for complete search history.

(56) References Cited

U.S. PATENT DOCUMENTS

| 9,444,437 B2* | 9/2016 | Bulzacchelli ...... H03K 3/35613 |
| 2013/0039666 A1 | 2/2013 | Hairapetian |
| 2015/0016496 A1 | 1/2015 | Mukherjee |

OTHER PUBLICATIONS

PCT Search Report for Application No. PCT/US 2016/036023, dated Oct. 27, 2016.

* cited by examiner

*Primary Examiner* — Lihong Yu
(74) *Attorney, Agent, or Firm* — Andrew Viger; Charles A. Brill; Frank D. Cimino

(57) ABSTRACT

A system includes a decision feedback equalizer (DFE). The DFE includes a first summing node, a first synchronization latch, a second synchronization latch, a first feedback latch, and a first feedback shift register. The first summing node is coupled to a data input of the DFE. The first synchronization latch receives data from the first summing node. The second synchronization latch and the first feedback latch receive data from the first synchronization latch. The first feedback shift register is coupled to an output of the second synchronization latch or the first feedback latch. The first feedback shift register includes sequentially coupled shift latches. A first of the shift latches data received from the second synchronization latch or the first feedback latch and provides data to the first summing node. First alternate ones of the shift latches are configured to provide feedback data to the first summing node.

14 Claims, 6 Drawing Sheets

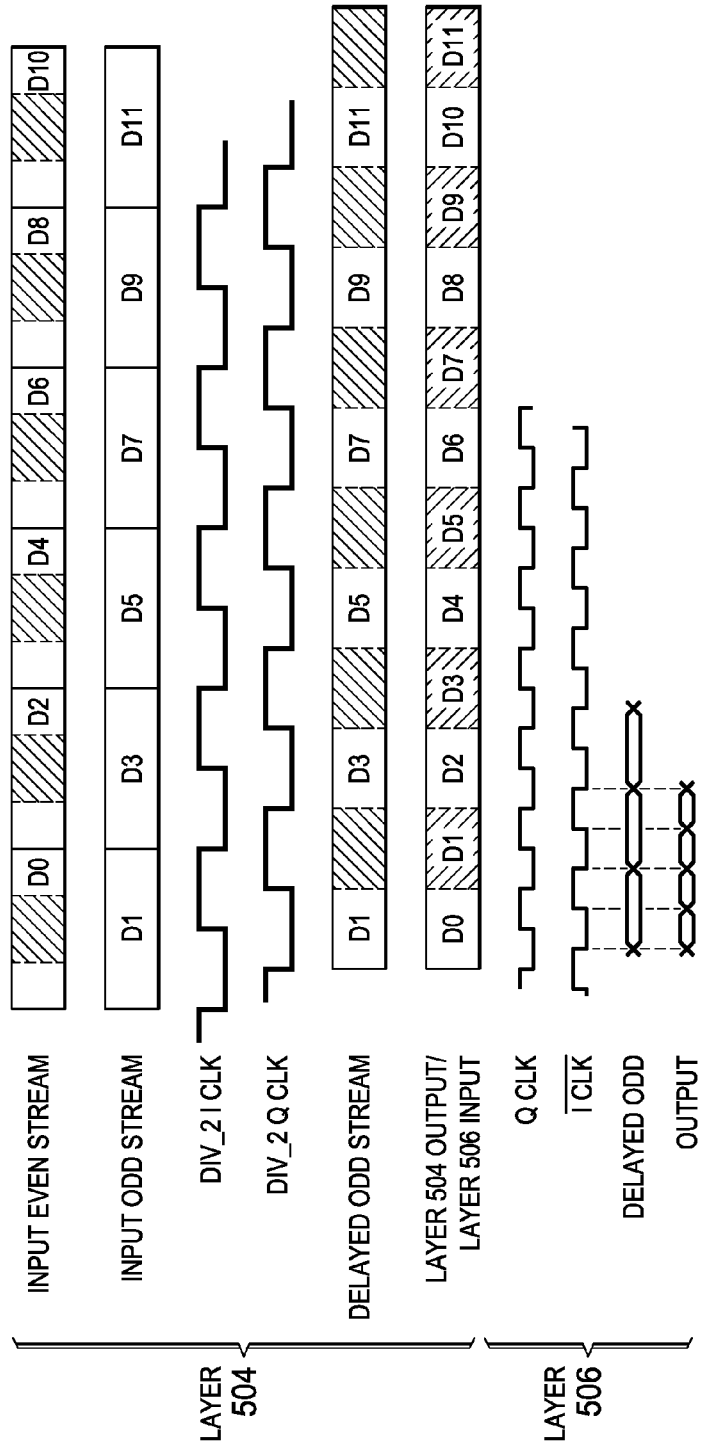

APPARATUS FOR PROCESSING A SERIAL DATA STREAM

CROSS-REFERENCE TO RELATED APPLICATIONS

The present application claims priority to U.S. Provisional Patent Application No. 62/171,409, filed Jun. 5, 2015, titled "Decision Feedback Equalizer for High Speed Applications," which is hereby incorporated herein by reference in its entirety.

BACKGROUND

As technology advances and the processing capabilities of digital computing devices increases, higher bandwidth networks are needed to interconnect the computing devices and facilitate use of the increasing computing power. However increasing network data rates can be problematic due to limited channel bandwidth. The bandwidth of an electrical channel (e.g., a transmission line) may be reduced by physical effects, such as skin effect, dielectric loss, and reflections due to impedance discontinuities.

Limited channel bandwidth can cause a transmitted pulse to spread across more than one unit interval, and as a result, the received signal may suffer from inter-symbol interference. Equalization functions may be added the input and/or output circuitry of a network to compensate for signal distortions resulting from limited channel.

A decision feedback equalizer (DFE) is a nonlinear equalizer that is well suited to equalizing a high-loss channel. Unlike linear equalizers, the DFE is able to flatten channel response and reduce signal distortion without amplifying noise or crosstalk, which is an important advantage when equalizing a high loss channel.

In a DFE, previously received bits are weighted, fed back, and added to the received input signal. If the magnitudes and polarities of the weights applied to the previously received bits are properly adjusted to match the channel characteristics, the inter-symbol interference from the previous bits in the data stream will be cancelled, and the bits can be detected with a low bit error rate.

SUMMARY

A novel decision feedback equalizer (DFE) and serializer are disclosed herein. In one implementation, a DFE circuit includes a first equalization path and a second equalization path. Each of the first equalization path and the second equalization path include a summing node, a first synchronization latch, a second synchronization latch, a feedback latch, and a feedback shift register. The first synchronization latch is configured to latch data received from the summing node. The second synchronization latch is configured to latch data received from the first synchronization latch. The feedback latch is coupled to an output of the first synchronization latch and configured to latch data received from the first synchronization latch. The feedback shift register is coupled to an output of one of the second synchronization latch and the feedback latch. The feedback shift register includes a plurality of sequentially coupled shift latches. A first of the shift latches is configured to latch data received from one of the second synchronization latch and the feedback latch and provide data to the summing node. A second of the shift latches is configured to latch data received from the first of the shift latches. In the first equalization path, the feedback latch and the second of the shift latches are configured to provide data to the summing node of the second equalization path. In the second equalization path, the feedback latch and the second of the shift latches are configured to provide data to the summing node of the first equalization path.

In another implementation a system includes a DFE. The DFE includes a first summing node, a first synchronization latch, a second synchronization latch, a first feedback latch, and a first feedback shift register. The first summing node is coupled to a data input of the DFE. The first synchronization latch is configured to receive data from the first summing node. The second synchronization latch is configured to receive data from the first synchronization latch. The first feedback latch is configured to receive data from the first synchronization latch. The first feedback shift register is coupled to an output of one of the second synchronization latch and the first feedback latch. The first feedback shift register includes a plurality of sequentially coupled shift latches. A first of the shift latches is configured to latch data received from one of the second synchronization latch and the first feedback latch and provide data to the first summing node. First alternate ones of the shift latches are configured to provide feedback data to the first summing node. The first summing node is configured to equalize a symbol received from the data input of the DFE by combining the data provided by the first feedback latch and the first alternate ones of the shifter latches with the symbol.

In a further implementation, a system includes a serializer. The serializer includes a plurality of layers of serialization cells. Each successive one of the layers includes fewer serialization cells than the preceding layer. Each of the serialization cells includes a first latch, a second latch, and a multiplexer. The multiplexer is coupled to an output of the first latch and the second latch. The first latch is controlled via a first clock. The second latch is controlled via a second clock. The first clock and the second clock are in a quadrature phase relationship. The multiplexer is configured to selectively route output of the first latch and the second latch to an output of the serialization cell based on the second clock.

BRIEF DESCRIPTION OF THE DRAWINGS

For a detailed description of various examples, reference will now be made to the accompanying drawings in which:

FIG. 7 shows a diagram of timing signals in two layers of a serializer in accordance with principles disclosed herein.

NOTATION AND NOMENCLATURE

Figure 1:
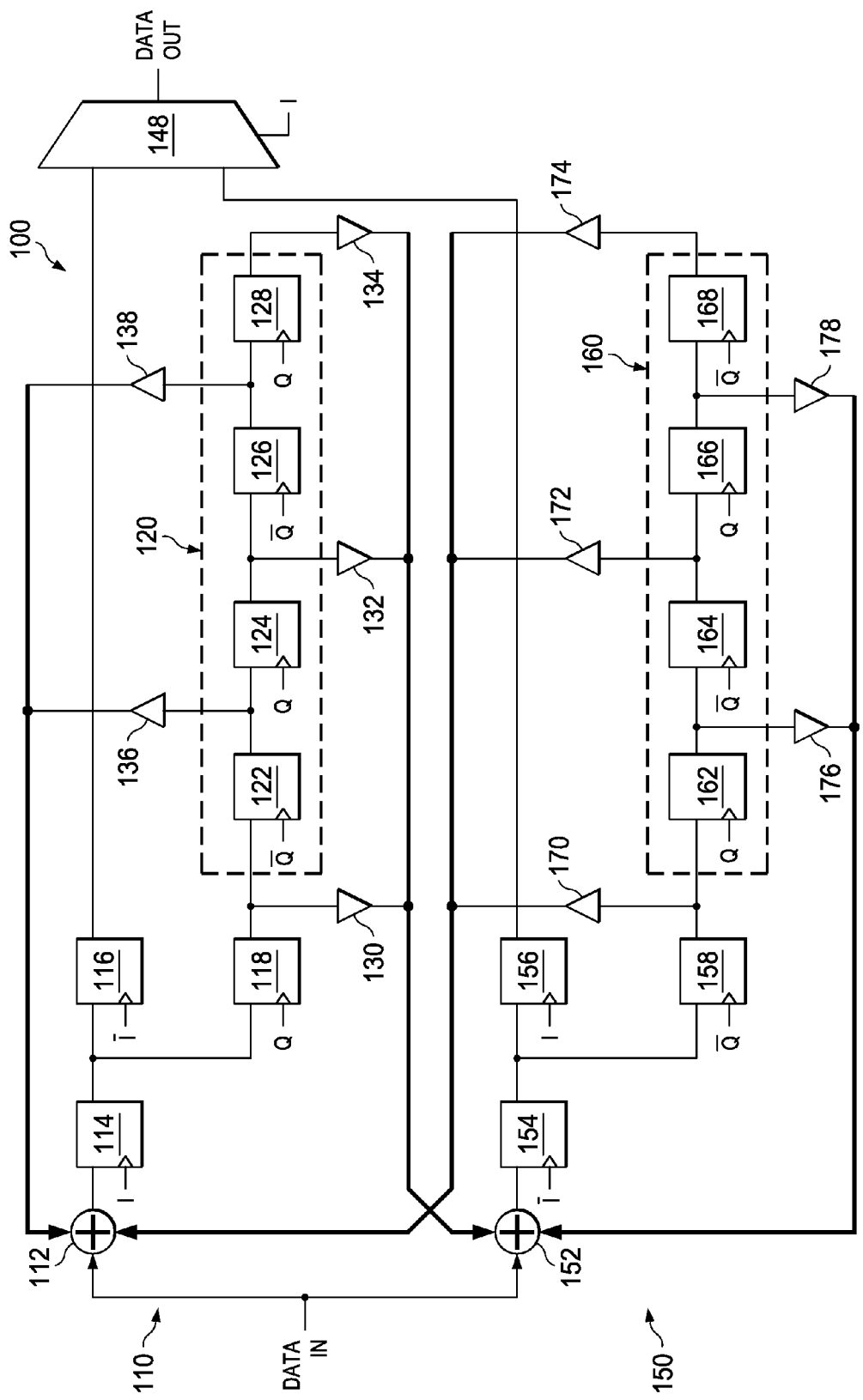
FIG. 1 shows a schematic diagram of a decision feedback equalizer (DFE) in accordance with principles disclosed herein.

Certain terms are used throughout the following description and claims to refer to particular system components. As one skilled in the art will appreciate, companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ."

The term "couple" or "couples" is intended to mean either an indirect or direct electrical connection. Thus, if a first device couples to a second device, that connection may be through a direct electrical connection, or through an indirect electrical connection via other devices and connections.

The recitation "based on" is intended to mean "based at least in part on." Therefore, if X is based on Y, X may be based on Y and any number of other factors.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Serializer/Deserializer (SERDES) circuits are employed in a variety of applications that require conversion of data between serial and parallel formats. SERDES circuits for processing of high-speed serial data streams may include equalization circuitry, such as a decision feedback equalizer (DFE) to mitigate the effects of inter-symbol interference.

In a conventional full-rate decision feed-back equalizer (DFE), proper operation requires that feedback loop delay be less than one unit interval (a unit interval is a symbol interval or symbol duration) which makes implementation increasingly difficult as data rates increase. Conventional half-rate DFE architectures may be subject to the same sample feedback delay requirements as full rate architectures. More complex half rate DFE architectures include sample and hold circuitry that relaxes the feedback delay requirements, but implementing suitable sample and hold circuitry can be difficult and expensive.

The DFE circuits disclosed herein employ a half-rate architecture and cross-coupled equalization paths. Each equalization path includes a feedback shift register that provides feedback data for use in the equalization paths. Some implementations include relaxed feedback timing requirements that allow equalization of higher rate data streams than would be possible with conventional DFE architectures. Alternatively, the DFE architectures disclosed herein allow implementation of DFEs for equalizing high rate data streams using semiconductor processes that may be unsuitable for implementing conventional DFEs to equalize such data streams.

SERDES circuits also include a serializer to convert data from parallel form to a bitstream. A serializer that requires less circuitry than conventional high-speed serializers is disclosed herein. The serializer of the present disclosure may be implemented with substantially less (e.g., 40% less) circuitry and energy consumption than conventional serializers with equivalent performance. Embodiments of the serializer disclosed herein avoid the use of flip-flops in favor of latches controlled via quadrature phase clock signals. In addition to reduced circuit area and power consumption, the use of quadrature phase clock signals may allow for increased performance due to reduced clock loading relative to conventional serializers.

FIG. 1 shows a schematic diagram of a DFE circuit 100 in accordance with principles disclosed herein. The DFE circuit 100 allows the feedback time specifications to be relaxed relative to conventional DFE implementations. Thus, the DFE circuit 100 is a half-rate implementation that allows for equalization of higher speed data streams than conventional full rate implementations on a given semiconductor process, while requiring less circuitry that conventional half-rate DFE implementations.

The DFE circuit 100 includes parallel equalization paths 110 and 150 with multiple feedback paths in each equalization path. Alternate symbols of the data stream received at the input of the DFE circuit 100 are processed in each of the equalization paths 110, 150. A multiplexer 148 selects output data from the equalization paths 110 and 150 to form an output data stream of equalized data. The multiplexer 148 serializes the half-rate data stream generated by the equalization paths 110 and 150 to produce a full-rate data stream.

The equalization path 110 includes a summing node 112, synchronization latches 114 and 116, feedback latch 118, and feedback shift register 120. The feedback shift register 120 includes shift latches 122, 124, 126, and 128. The equalization path 150 includes a summing node 152, and synchronization latches 154 and 156, feedback latch 158, and feedback shift register 160. The feedback shift register 160 includes shift latches 162, 164, 166, and 168. Each of the summing nodes 112 and 152 receives data from the input of the DFE circuit 100, and includes circuitry for summing the input data with feedback data.

In equalization path 110, the synchronization latch 114 receives as input summed data from the summing node 112 and provides output data as input to the synchronization latch 116 and the feedback latch 118. The feedback latch 118 provides output data as input to the feedback shift register 120. The data received by the feedback shift register 120 from the feedback latch 118 is latched in the shift latch 122 and shifted through the successive shift latches 124, 126, and 128. The output data of the feedback latch 118, shift latch 124, and shift latch 128 are weighted in respective gain stages 130, 132, and 134, and provided to the summing node 152 of the equalization path 150. The output data of shift latches 122 and 126 are weighted in respective gain stages 136 and 138, and provided to the summing node 112 of the equalization path 110.

Similarly, in equalization path 150, the synchronization latch 154 receives as input summed data from the summing node 152 and provides output data for input to the synchronization latch 156 and the feedback latch 158. The feedback latch 158 provides output data as input to the feedback shift register 160. The data received by the feedback shift register 160 from the feedback latch 158 is latched in the shift latch 162 and shifted through the successive shift latches 164, 166, and 168. The output data of the feedback latch 158, shift latch 164, and shift latch 168 are weighted in respective gain stages 170, 172, and 174 and provided to the summing node 112 of the equalization path 110. The output data of shift latches 162 and 166 are weighted in respective gain stages 176 and 178 and provided to the summing node 152 of the equalization path 150.

Outputs of the synchronization latches 116 and 156 are provided to the multiplexer 148, or equivalent selection circuitry, that selects/routes the outputs of the latches 116, 156 to the output of the DFE circuit 100.

The gain stages 130-138 and 170-178 scale the outputs of latches 118-128 and 158-168 for combination with the data input to the circuit 100. The polarities of the feedback signals provided from each of the gain stages 130-138 and 170-178 can be changed in the gain stage, in the summing nodes 112 and 152, or elsewhere in the DFE circuit 100.

While the DFE circuit 100 has been illustrated as included a feedback shift register 120, 160 that includes four shift latches, some embodiments of the DFE feedback shift register may include more or fewer shift latches with associated gain stages. In some embodiments, the feedback registers 118 and 158 may be respectively included in the feedback shift registers 120 and 160.

Figure 2:
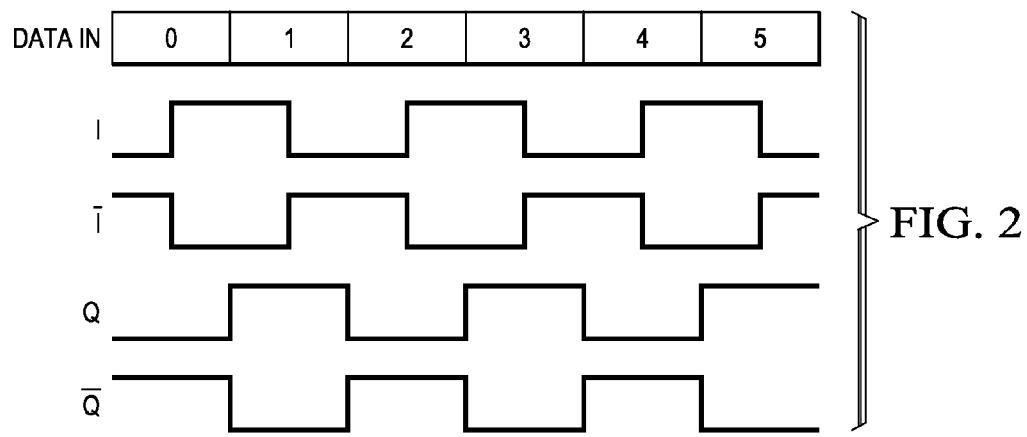
FIG. 2 shows a diagram of timing signals applicable to the DFE of FIG. 1.

FIG. 2 shows the control signals applied to the DFE circuit 100. The clocks I and Q have a period that is twice the unit interval of the data input to the circuit 100. The clock I is aligned to transition at, or approximately at, the center of each unit interval. The clock Q is a quadrature phase (i.e., delayed by 90 degrees) version of clock I. Accordingly, the transitions of clock Q are aligned at, or approximately at, the edges of the unit interval of the data input to the circuit 100. Thus, latches controlled by the clock Q pass data during even numbered unit intervals and latch data during odd numbered unit intervals, while latches controlled by an inverted version of the clock Q pass data during odd numbered unit intervals and latch data during even numbered unit intervals.

In equalization path 110, the clock I causes the latch 114 to transparently pass the data received from the summing node 112 in the initial half of each even numbered unit interval, and to latch the data through the middle of the subsequent odd-numbered unit interval. The clock Q causes the latch 118 to transparently pass the data received from the latch 114 throughout even numbered unit intervals and to latch the received data throughout odd numbered unit intervals. Thus, the latch 118 captures the data latched by the latch 114 and aligns the feedback data over the next unit interval for combination with input data in summing node 152.

The latch 116 is clocked by an inverted version of clock I. Accordingly, latch 116 is transparent while latch 114 is latched and stores the output of latch 114 for an additional unit interval after latch 114 becomes transparent. Latch 122 is clocked by inverted version of clock Q to latch, hold, and align the data provided from latch 118 with the subsequent even numbered unit interval. Thus, the latch 122 aligns the feedback data for combination with input data in summing node 112. Accordingly, in equalization path 110, for equalization of data in a given unit interval (e.g., unit interval 2), feedback from the immediately preceding unit interval (e.g., unit interval 1) is provided from the other equalization path 150, while feedback from the unit interval two ahead (unit interval 0) of the given unit interval is provided from equalization path 110. Shift latches 124 and 128 are also clocked by clock Q, and latch data for provision to the summing node 152. Shift latch 126 is clocked by the inverted version of clock Q and latches data for provision to summing node 112.

Applying clock I to latch 156, clock Q to latches 162 and 166, the inverse of clock I to latch 154, and the inverse of clock Q to latches 158, 164, and 168, the equalization path 150 operates similarly to equalization path 110 with respect to odd unit intervals. Thus, the DFE circuit 100 provides reduced implementation complexity relative to full-rate DFEs and conventional half-rate DFEs. The DFE circuit 100 advantageously increases the time available for feedback of previously received symbol data. For example, at a 25 giga-bit input rate, the DFE 100 allows 40 picoseconds for feedback, rather than 20 picoseconds as provided in conventional DFE implementations. Accordingly, the DFE 100 provides equalization at rates equivalent to that provided by a full rate architecture, but allows implementation using a less complex and less expensive semiconductor process. Conversely, on a given semiconductor process, the DFE 100 can be used to equalize higher rates than allowed by a conventional full-rate DFE. Further, DFE circuit 100 use simple 50% duty cycle clocks which are easier to generate and propagate in high-speed circuitry than asymmetric clocks. Additionally, in contrast to conventional DFEs, with the DFE circuit 100, feedback data need not be provided exactly at the unit interval boundary (i.e., the symbol zero crossing), but rather feedback data may advantageously be provided at any time, within margin constraints, prior to the unit interval during which the feedback data is to combined with input data.

Figure 3:
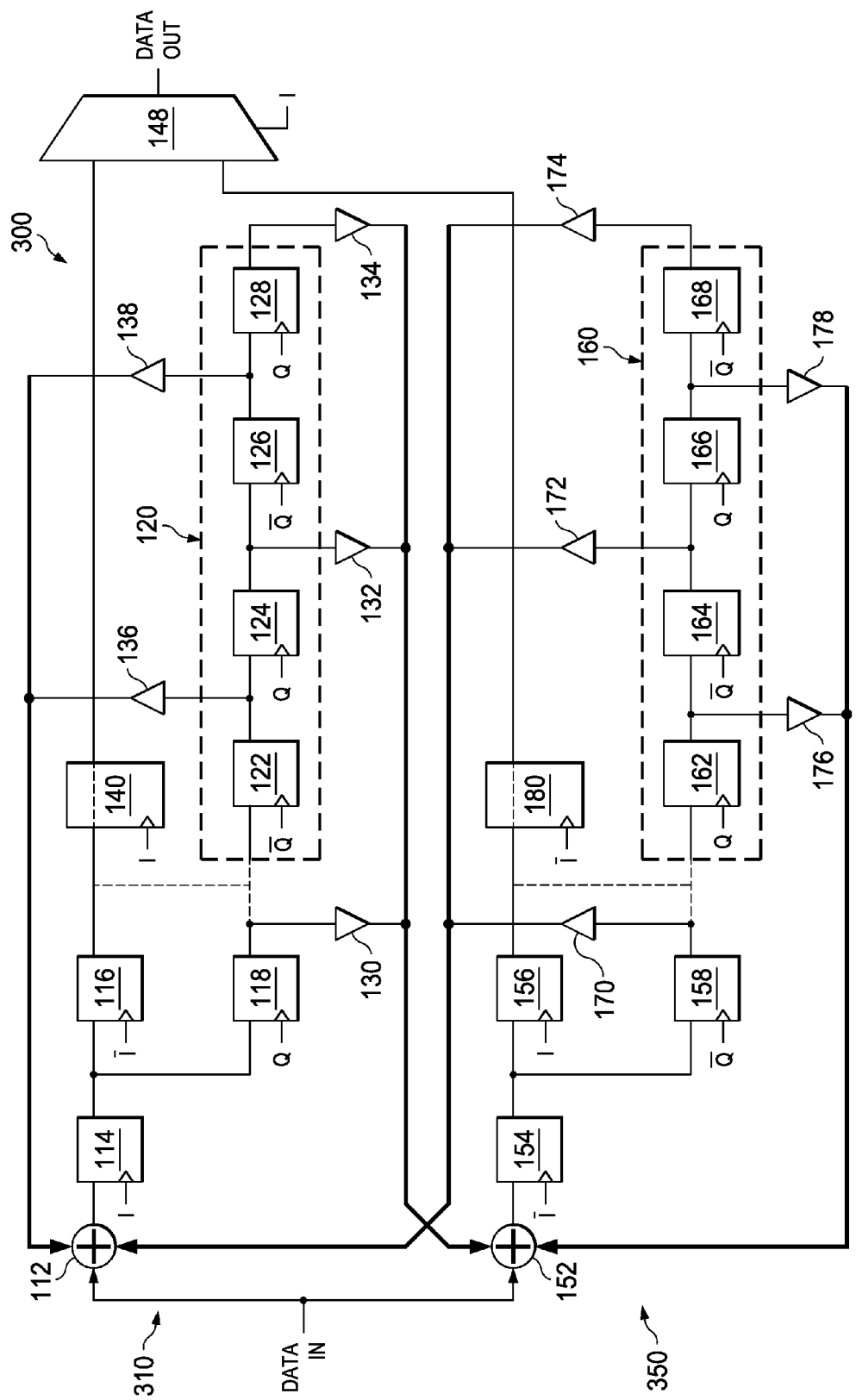
FIG. 3 shows a schematic diagram of a DFE in accordance with principles disclosed herein.

The DFE circuit 100 may be modified in various ways. FIG. 3 shows a schematic diagram of a DFE circuit 300 that is similar to the DFE circuit 100. The DFE circuit 200 includes parallel equalization paths 310 and 350. In some embodiments of the circuit 300, an additional synchronization latch 140 is coupled to the output of the synchronization latch 116. The synchronization latch 140, rather than the synchronization latch 116 as in DFE circuit 100, is connected to, and provides equalized output data to, the multiplexer 148. In some embodiments, the feedback shift register 120 is coupled to, and receives input data from, the synchronization latch 116, rather than the feedback latch 118 as in the DFE circuit 100.

Similarly, in some embodiments of the circuit 300, an additional synchronization latch 180 is coupled to the output of the synchronization latch 156. The synchronization latch 180 is coupled to, and provides equalized output data to, the multiplexer 148. In some embodiments, the feedback shift register 160 is coupled to, and receives input data from, the synchronization latch 156, rather than the feedback latch 158.

Figure 4:
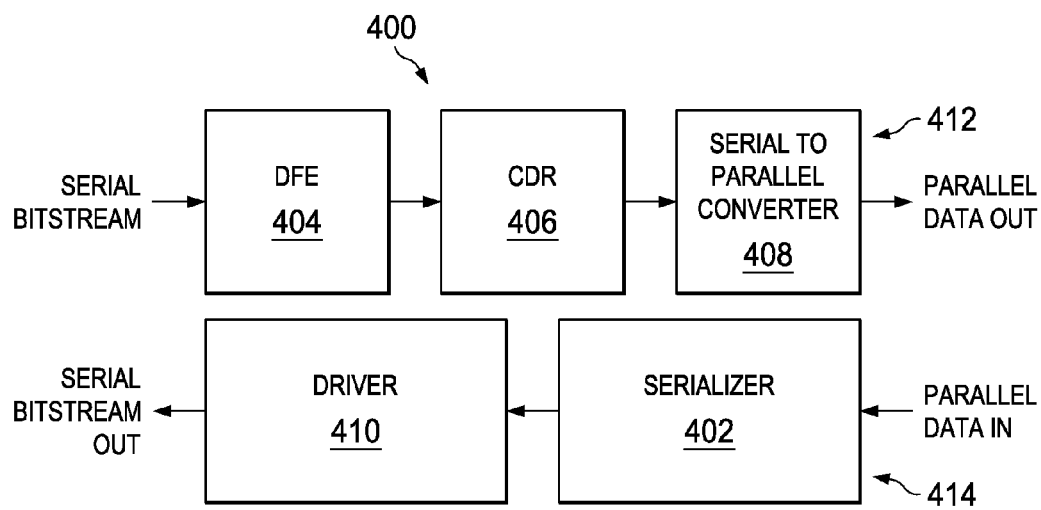
FIG. 4 shows a block diagram of a Serializer/Deserializer (SERDES) in accordance with principles disclosed herein.

FIG. 4 shows a block diagram of a SERDES 400 in accordance with various implementations. The SERDES 400 includes a serial-to-parallel conversion path 412 and a parallel-to-serial conversion path 414. The serial-to-parallel conversion path 412 includes a DFE circuit 404, which may the DFE circuit 100 or the DFE circuit 300, a clock/data recovery (CDR) circuit 406, and a serial-to parallel-converter 408. The DFE 404 equalizes the serial input data to mitigate inter-symbol interference. The CDR circuit 406 extracts clock and data signals from the equalized serial data stream generated by the DFE 404. The serial-to parallel-converter 408 groups data bits recovered by the CDR circuit 406 in parallel words. The serial-to-parallel conversion path 412 may include various other components and subsystems that have been omitted in the interest of clarity. For example, the serial-to-parallel conversion path 412 may include addition equalization circuitry, receiver circuitry, clock generation circuitry, etc.

The parallel-to-serial conversion path 414 includes a serializer 402 and a driver 410. The serializer 402 receives parallel data words (each word including a number of simultaneously presented data bits) and converts the parallel data words into a serial bitstream. The driver 410 conditions the serial bitstream generated by the serializer 410 for transmission to other circuitry.

In addition to the SERDES 400, the DFE circuit 404 and/or the serializer 402 may also be applied in other applications, circuits, or systems that receive and/or generate serial data streams.

Figure 5:
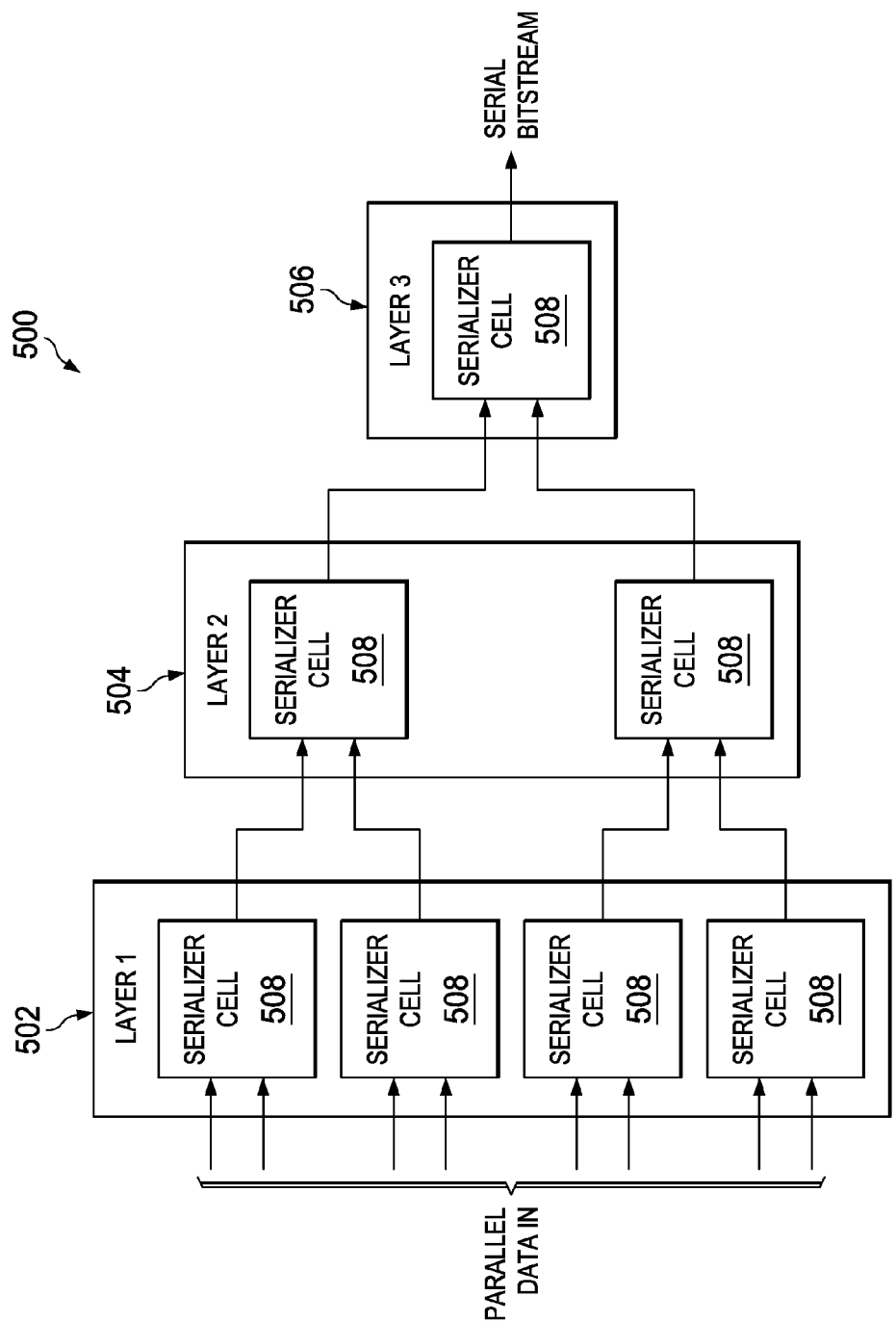
FIG. 5 shows a schematic diagram of a serializer in accordance with principles disclosed herein.

FIG. 5 shows a schematic diagram of a serializer 500 in accordance with principles disclosed herein. The serializer 500 may applied in the SERDES 400 as the serializer 402. The serializer 500 includes multiple serialization layers 502, 504, 506 arranged in a tree structure where the output serial bitstream is generated at the root of the tree. The three serialization layers 502, 504, 506 are arranged for serialization of eight bits of parallel data presented at the inputs of the serialization layer 502. Other embodiments of the serializer 500 may include a different number of layers to serialize a different number of parallel data bits. Each of the serialization layers 502-506 includes one or more serialization cells 508. Each serialization cell 508 serializes two simultaneously presented bits/bitstreams.

Figure 6:
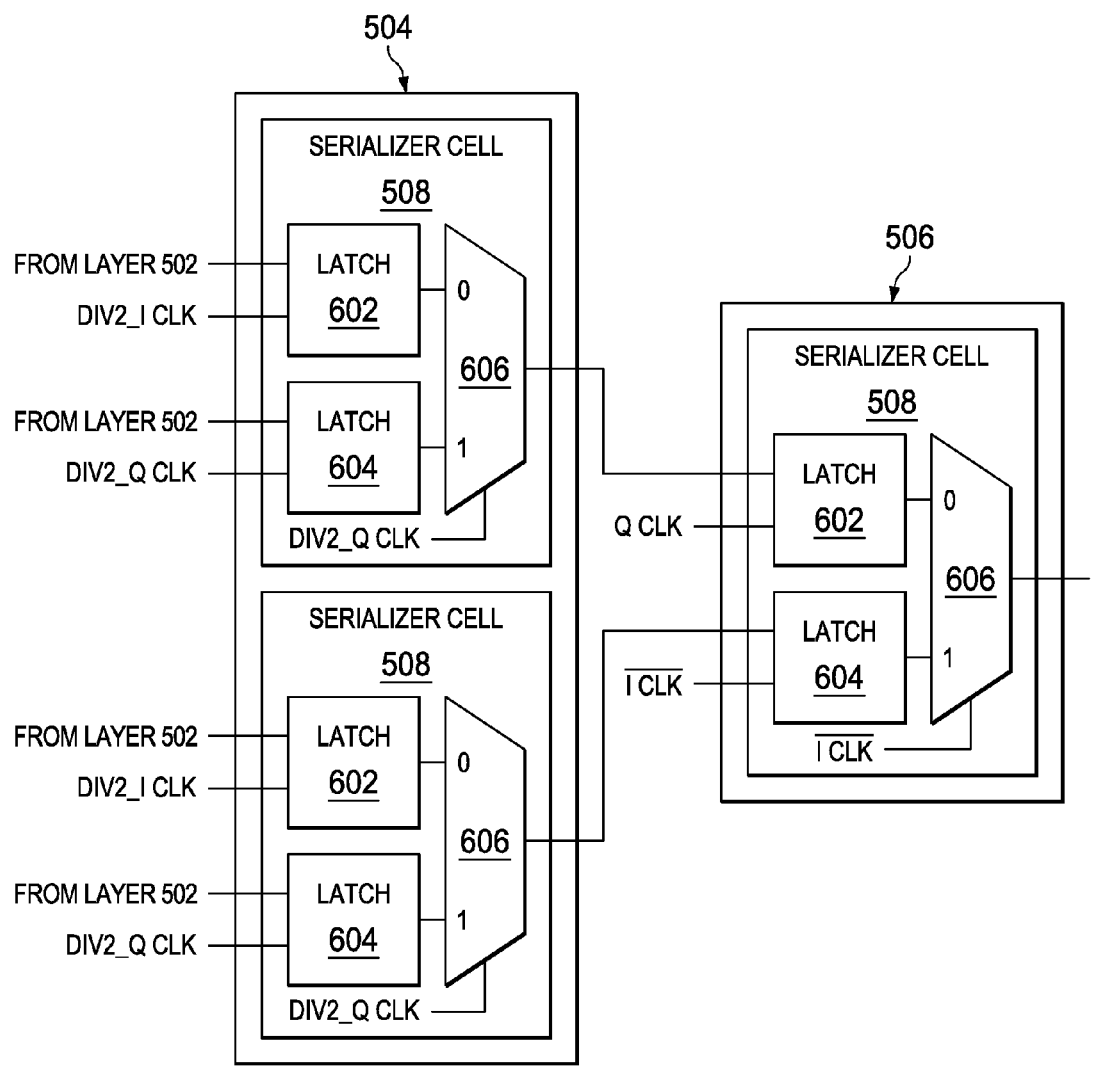
FIG. 6 shows a schematic diagram of two layers of a serializer and serializer cells in accordance with principles disclosed herein.

FIG. 6 shows a schematic diagram of layers 504 and 506 of serializer 500 and shows additional details of the serializer cells 508. Each serializer cell 508 includes latch 602, latch 604, and multiplexer 606. The latches 602 and 604 each receive as input a bit to be serialized. The multiplexer 606 selects, in turn, the output of each latch 602 and 604 to serialize the latch outputs.

Referring to serialization cell 508, which generates the output serial bitstream for the serializer 500, the latch 604 is controlled by Iclk and the latch 602 is controlled by Qclk. Qclk is a quadrature phase version of Iclk (i.e., Qclk is Iclk delayed by 90°). The multiplexer 606 is controlled by the clock applied to latch 604, Iclk in serializer cell 508.

Because the rate of data to be serialized by a cell 508 doubles in each subsequent layer of the serializer 500, the clock applied to latches 602 and 604, and the multiplexer 606 in a given layer is twice the rate of that applied in the subsequent layer. Thus, the versions of Iclk and Qclk applied in serialization layer 504 are half the frequency of the versions of Iclk and Qclk applied in serialization layer 506. Similarly, the versions of Iclk and Qclk applied in serialization layer 502 are half the frequency of the versions of Iclk and Qclk applied in serialization layer 504. That is, viewing the layers of the serializer 500 from the output of the serializer 500, each more distant layer applies clocks that are half the frequency of the clocks applied in the adjacent layer that is closer to output of the serializer 500.

Additionally, with each subsequent layer of the serializer 500, the clock phase applied to the latches 602 and 604, and multiplexer 606 is changed. In layer 506, the quadrature phase clock is applied to latch 602, and the in-phase clock is applied to latch 604 and the multiplexer 606. The clocking is changed in layer 504, such that the in-phase phase clock is applied to latch 602, and the quadrature phase clock is applied to latch 604 and the multiplexer 606.

FIG. 7 shows a diagram of timing signals in a serializer cell 508 in accordance with principles disclosed herein. The timing of FIG. 7 is with respect to operation of a serializer cell 508 of layers 504 and 506 of the serializer 500. In layer 504, the data bits are presented to the serializer cell 508 at the rate of the clock Iclk. The clock Iclk (DIV_2 ICLK) transitions at approximately the transition times of the data bits. The clock signal Qclk (DIV_2 QCLK) is offset from Iclk by 90°. The multiplexer 606 is controlled by the Qclk. Accordingly, data output of the serializer 508, in layer 504, is synchronized with Qclk, and each output bit is presented for one-half the period of Qclk.

The data labeled INPUT EVEN STREAM is presented to latch 602, and the data labeled INPUT ODD STREAM is presented to latch 604. Latch 602 is transparent when Iclk is low and latches the input data when Iclk is high. The multiplexer 606 selects the output of latch 602 when Qclk is low. Accordingly, the multiplexer 606 selects the output of the latch 602 for output during the center portion of each unit interval, as shown in FIG. 7. The latch 604 is transparent when Qclk is low and latches the input data when Qclk is high. Thus, the latch 604 delays the INPUT ODD STREAM by ¼ of an Iclk cycle, and the multiplexer 606 selects the output of latch 604 during the high portion of Qclk.

In the subsequent serializer layer (i.e., layer 506), the Qclk applied is phase aligned with, and twice the frequency of, the Qclk applied in the previous layer (i.e., layer 504). The input data received in the layer 506 transitions at approximately the high to low transitions times of the Qclk. The Iclk applied in the layer 506 is phase aligned with, and twice the frequency of the Iclk applied in the previous layer (i.e., layer 504). The Iclk is also inverted relative to that applied in layer 504. That is, the timing relationship of Iclk and Qclk are the same as in the previous layer, but the Iclk is inverted such that Iclk is delayed by 90° relative to Qclk. The Qclk is applied to the multiplexer 606 and the latch 602, while the inverted Iclk is applied to the latch 604. Thus, the clocks applied to the latches 602 and 604 and multiplexer 606 are switched relative to layer 504, as explained above, and, in layer 506, the DELAYED ODD STREAM is delayed by ¼ cycle via the inverted Iclk. As shown in FIG. 7, the output of layer 506 is synchronous with the inverted Iclk.

Thus, in each subsequent layer of the serializer 500, the clock applied to the multiplexer of the previous layer is applied at twice the frequency to the latch(es) 502 of the subsequent layer, and the inverse of the clock applied to the latch(es) 502 of the previous layer is applied at twice the frequency to the latch(es) 504 and the multiplexer 506 of the subsequent layer. Use of quadrature phase clocks in the arrangement described above allows the serializer 500 to generate a serial bit stream with substantially less circuitry than conventional serializer while potentially increasing the output bit rate.

The above discussion is meant to be illustrative of the principles and various implementations of the present disclosure. Numerous variations and modifications will become apparent to those skilled in the art once the above disclosure is fully appreciated. It is intended that the following claims be interpreted to embrace all such variations and modifications.

What is claimed is:

1. A decision feedback equalizer (DFE) circuit, comprising:
   an input terminal to receive input data;
   a first equalization path and a second equalization path, each comprising:
      a summing node coupled to the input terminal to receive input data received at the input terminal;
      a first synchronization latch to latch data received from the summing node;
      a second synchronization latch to latch data received from the first synchronization latch;
      a feedback latch coupled to an output of the first synchronization latch to latch data output from the first synchronization latch, and to output feedback data;
      a feedback shift register coupled to an output of one of the second synchronization latch and the feedback latch, to output feedback shift data, the feedback shift register comprising a plurality of sequentially coupled shift latches, wherein:

a first of the shift latches to latch the feedback data and to provide data to the summing node; and a second of the shift latches to latch data received from the first of the shift latches;

in the first equalization path, the feedback latch, the feedback shift register and the second of the shift latches to provide data to the summing node of the second equalization path; and in the second equalization path, the feedback latch, the feedback shift register and the second of the shift latches to provide data to the summing node of the first equalization path.

2. The DFE circuit of claim 1, wherein in each of the first equalization path and the second equalization path, a third of the shift latches is to latch data received from the second of the shift latches and to provide data to the summing node of the equalization path; and a fourth of the shift latches to latch data received from the third of the shift latches and to provide data to the summing node of the other one of the first and second equalization paths.

3. The DFE circuit of claim 1, wherein the feedback latch is clocked by a clock that clocks the first synchronization latch shifted by 90 degrees.

4. The DFE circuit of claim 1, wherein:

in the first equalization path:

the first synchronization latch is clocked by a first clock having a period that is twice a symbol interval time of the input data received at the input terminal;

the second synchronization latch is clocked by a second clock that is an inversion of the first clock; and the first of the shift latches is clocked by a third clock that is a quadrature phase shifted version of the second clock; and in the second equalization path:

the first synchronization latch is clocked by the second clock;

the second synchronization latch is clocked by the first clock;

the feedback shift register is clocked by a fourth clock that is an inversion of the third clock.

5. The DFE circuit of claim 4, further comprising a multiplexer coupled to the second synchronization latch of each equalization path, to selectively route, based on the second clock, data received from the second synchronization latch of each equalization path to an output of the DFE circuit.

6. The DFE circuit of claim 4, further comprising a multiplexer; and each of the first equalization path and the second equalization path includes a third synchronization latch to latch data received from the second synchronization latch of the equalization path and to provide data to the multiplexer; and the multiplexer to selectively route, based on the first clock, data received from the third synchronization latch of each equalization path to an output of the DFE circuit.

7. The DFE circuit of claim 1 wherein, in each of the first equalization path and the second equalization path, each successive one of the shift latches is clocked by a clock signal that is an inversion of a clock signal applied to an immediately preceding one of the shift latches.

8. A serializer/deserializer (SERDES) circuit, comprising:

a parallel_in terminal to receive parallel data, and a serial_out terminal to output serialized data;

a serial_in terminal to receive serial data, and a parallel_out terminal to output deserialized data;

deserializer circuitry to deserialize serial_in data received at the serial_in terminal, and provide deserialized data to the parallel_out terminal;

the deserializer circuitry including decision feedback equalizer (DFE) circuitry, comprising a first equalization path and a second equalization path, each comprising:

a summing node to receive serial data from the serial_in terminal;

a first synchronization latch to latch data received from the summing node;

a second synchronization latch to latch data received from the first synchronization latch;

a feedback latch coupled to an output of the first synchronization latch to latch output data output from the first synchronization latch, and to output feedback data;

a feedback shift register coupled to an output of one of the second synchronization latch and the feedback latch, and to output feedback data, the feedback shift register comprising a plurality of sequentially coupled shift latches, wherein:

a first of the shift latches operable to latch the feedback data and to provide data to the summing node; and a second of the shift latches to latch data received from the first of the shift latches;

in the first equalization path, the feedback latch, the feedback shift register and the second of the shift latches to provide data to the summing node of the second equalization path; and in the second equalization path, the feedback latch, the feedback shift register and the second of the shift latches to provide data to the summing node of the first equalization path.

9. The SERDES circuit of claim 8, wherein in each of the first equalization path and the second equalization path, a third of the shift latches to latch data received from the second of the shift latches and provide data to the summing node of the equalization path; and a fourth of the shift latches to latch data received from the third of the shift latches and to provide data to the summing node of the other one of the first and second equalization paths.

10. The SERDES circuit of claim 8, wherein the feedback latch is clocked by a clock that clocks the first synchronization latch shifted by 90 degrees.

11. The SERDES circuit of claim 8, wherein:

in the first equalization path:

the first synchronization latch is clocked by a first clock having a period that is twice a symbol interval time of the serial-in data received at the serial_in terminal;

the second synchronization latch is clocked by a second clock that is an inversion of the first clock; and the first of the shift latches is clocked by a third clock that is a quadrature phase shifted version of the second clock; and in the second equalization path:

the first synchronization latch is clocked by the second clock;

the second synchronization latch is clocked by the first clock;

the feedback shift register is clocked by a fourth clock that is an inversion of the third clock.

12. The SERDES circuit of claim 11, further comprising a multiplexer coupled to the second synchronization latch of each equalization path, to selectively route, based on the second clock, data received from the second synchronization latch of each equalization path to the parallel_out terminal.

13. The SERDES circuit of claim 11,
further comprising a multiplexer;
each of the first equalization path and the second equalization path includes a third synchronization latch to latch data received from the second synchronization latch of the equalization path and to provide data to the multiplexer; and
the multiplexer is operable to selectively route, based on the first clock, data received from the third synchronization latch of each equalization path to the parallel_out terminal.

14. The SERDES circuit of claim 8 wherein, in each of the first equalization path and the second equalization path, each successive one of the shift latches is clocked by a clock signal that is an inversion of a clock signal applied to an immediately preceding one of the shift latches.

* * * * *